United States Patent
Matsumoto et al.

(10) Patent No.: US 9,566,849 B2
(45) Date of Patent: Feb. 14, 2017

(54) REAR VEHICLE-BODY STRUCTURE OF VEHICLE

(71) Applicant: MAZDA MOTOR CORPORATION, Hiroshima (JP)

(72) Inventors: Kouichi Matsumoto, Hiroshima (JP); Takashi Senoo, Hiroshima (JP); Masaki Oda, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/833,460

(22) Filed: Aug. 24, 2015

(65) Prior Publication Data
US 2016/0089965 A1   Mar. 31, 2016

(30) Foreign Application Priority Data

Sep. 26, 2014   (JP) .................................. 2014-197052

(51) Int. Cl.
| | |
|---|---|
| *B60J 7/14* | (2006.01) |
| *B60J 7/20* | (2006.01) |
| *B60Q 3/02* | (2006.01) |
| *B60J 1/18* | (2006.01) |

(52) U.S. Cl.
CPC ............... *B60J 7/202* (2013.01); *B60J 1/1823* (2013.01); *B60J 7/146* (2013.01); *B60Q 3/02* (2013.01)

(58) Field of Classification Search
CPC ........... B60J 7/202; B60J 7/143; B60J 1/1815; B60Q 3/02
USPC .......................... 298/107.08, 107.09, 107.11, 107.15,298/107.16, 107.05, 107.17, 135; 280/756; 296/107.08, 107.09, 107.11, 107.15, 296/107.16, 107.05, 107.17, 135
See application file for complete search history.

(56) References Cited

U.S. PATENT DOCUMENTS

| | | | | |
|---|---|---|---|---|
| 6,053,560 A | * | 4/2000 | Rothe ..................... | B60J 7/028 296/107.16 |
| 7,021,695 B2 | * | 4/2006 | Quindt ................... | B60J 1/1823 296/107.09 |
| 7,172,242 B2 | * | 2/2007 | Heselhaus ............. | B60J 7/1265 296/107.09 |
| 7,455,347 B2 | * | 11/2008 | Heselhaus ............. | B60J 7/0061 296/107.17 |
| 7,832,784 B2 | * | 11/2010 | Cimatti ................... | B60J 1/183 296/107.09 |

(Continued)

FOREIGN PATENT DOCUMENTS

| | | |
|---|---|---|
| JP | 2007-261405 A | 10/2007 |
| WO | 2005/061253 A1 | 7/2005 |

*Primary Examiner* — Jason S Morrow
*Assistant Examiner* — E Turner Hicks
(74) *Attorney, Agent, or Firm* — Studebaker & Brackett PC

(57) ABSTRACT

There is provided a deck lid provided to move so as to cover an opening portion of a roof storage room in a roof closed state in which an openable roof covers over a passenger cabin and in a roof open state in which a portion of the openable roof is stored in the roof storage room and to open the opening portion of the roof storage room in a transitional state between the roof closed state and the roof open state. This deck lid comprises a base portion, a pair of right-and-left protrusion portions which are integrally formed at both end portions, in a vehicle width direction, of the base portion, protrude upward relative to the base portion, and extend in a vehicle longitudinal direction, and a connecting portion which interconnects respective upper portions of the pair of protrusion portions in the vehicle width direction.

12 Claims, 14 Drawing Sheets

(56) References Cited

U.S. PATENT DOCUMENTS

| | | | |
|---|---|---|---|
| 8,459,719 B2 * | 6/2013 | Schulzki | B60J 7/0053 |
| | | | 280/756 |
| 8,596,709 B2 * | 12/2013 | Ugolini | B60J 7/146 |
| | | | 280/756 |
| 2010/0164247 A1 * | 7/2010 | Neubrand | B60J 7/20 |
| | | | 296/116 |

* cited by examiner

REAR VEHICLE-BODY STRUCTURE OF VEHICLE

BACKGROUND OF THE INVENTION

The present invention relates to a rear vehicle-body structure of a so-called open car provided with an openable roof.

Vehicles with an openable roof (convertible type open car) have been developed, and examples of those vehicles are disclosed in International Publication No. WO 2005/061253 A1 and Japanese Patent Laid-Open Publication No. 2007-261405.

As shown in FIGS. 13-15, an automotive vehicle 100 disclosed in the above-described first patent document comprises a foldable roof 100, a housing 102 to store the foldable roof 101 (see FIG. 14), and a lid 103 to close an opening portion of the housing 102. The lid 103 comprises a plate-shaped base portion 104 and a pair of vertical fins 105 which are provided at both sides, in a vehicle width direction, of the base portion 104. The base portion 104 comprises a central portion 104a which is of a rectangular shape in a plan view and a pair of side portions 104b which are integrally formed at both sides, in the vehicle width direction, of the central portion 104a. Each of the side portions 104b protrudes rearward beyond the central portion 104a in the plan view (a rear portion of the base portion 104 is of a concave shape in the plan view). The vertical fin 105 is configured to protrude upward at the side portion 104b of the base portion 104 and extend in a vehicle longitudinal direction. The vertical fin 105 is of a right triangular shape, when viewed from a vehicle side, such that the hypotenuse of the right triangle slants rearward and downward. An acute-angle portion 105a of the right triangle which has the smallest angle is positioned at a rear end portion of the side portion 104b.

The both-side side portions 104b of the base portion 104 are rotatably attached to a back face of a rear deck 107 via arc-shaped hinges 106 (see FIG. 14). The arc-shaped hinge 106 is a so-called swan hinge, and its one end portion is rotatably attached to a lower face of the rear deck 107 around a horizontal axis, and its other end portion is fixed to a lower face of the side portion 104b of the base portion 104.

A flat-shaped transparent panel 109 which forms a rear window of a passenger cabin 108 is arranged vertically at a border of the passenger cabin 108 and the base portion 104. The transparent panel 109 is guided by a vertical side guide portion (not illustrated) at its both-side end portions so as to move vertically.

The transparent panel 109 is configured to partition the passenger cabin 108 from a space formed between the right and left vertical fins 105 in a state in which the transparent panel 109 is pulled out upward.

For a transition from the closed state in which the foldable roof 101 covers over the passenger cabin 108 (see FIG. 13) to the open state in which the foldable roof 101 is stored in the housing 102 (see FIG. 15), the lid 103 is opened as shown in FIG. 14, then the foldable roof 101 is folded into the housing 102, and finally the lid 103 is closed (see FIG. 15).

According to the automotive vehicle 100 of the above-described first patent document, the vertical fin 105 creates a coupe-style appearance at a rear portion of the vehicle in a side view, so that the automotive vehicle 100 equipped with the roof can be superior (excellent) in design. Further, a driver can view (see) backward through the transparent panel 109.

The above-described second patent document discloses an automotive vehicle which comprises a retractable roof, a storage space to store the retractable roof, an openable lid to cover an opening portion of the storage space, and a link mechanism connecting the lid and a bottom portion of the storage space.

The above-described link mechanism is a mechanism to open or close the lid. The link mechanism is configured to be folded in a state in which the retractable roof is stored in the storage space (an open state) and in a state in which the retractable roof covers over the passenger cabin (a closed state).

Meanwhile, in the transition from the open state to the closed state, and in the transition from the closed state to the open state, the link mechanism rises up and the lid goes up, moving rearward, relative to the opening portion of the storage space.

According to the automotive vehicle of the above-described second patent document, since the lid goes up, moving rearward, relative to the opening portion of the storage space, the retractable roof can be stored in the storage space through the opening portion.

However, in the automotive vehicle 100 of the above-described first patent document, since the right-and-left vertical fins 105 are merely interconnected at respective lower end portions, the lid 103 does not have a sufficient (high) rigidity.

Herein, in a case in which the lid 103 is configured move by using the link mechanism shown in the above-described second patent document in place of the hinges 106, there is a problem that a twist of the lid 103 may be generated during the moving because of the insufficient (low) rigidity of the lid 103, so that the stability of the move may be deteriorated.

SUMMARY OF THE INVENTION

The present invention has been devised in view of the above-described matters, and an object of the present invention is to provide a rear vehicle-body structure of a vehicle which can properly improve the rigidity and the design of a deck lid.

The present invention is a rear vehicle-body structure of a vehicle, comprising an openable roof capable of covering over a passenger cabin, a roof storage room provided in back of the passenger cabin to store at least a portion of the openable roof, a deck lid provided to move so as to cover an opening portion of the roof storage room in a roof closed state in which the openable roof covers over the passenger cabin and in a roof open state in which the portion of the openable roof is stored in the roof storage room and to open the opening portion of the roof storage room in a transitional state between the roof closed state and the roof open state, and a link mechanism connecting the deck lid to a vehicle body such that the deck lid swings relative to the vehicle body, wherein the deck lid comprises a base portion, a pair of right-and-left protrusion portions which are integrally formed at both end portions, in a vehicle width direction, of the base portion, protrude upward relative to the base portion, and extend in a vehicle longitudinal direction, and a connecting portion which interconnects respective upper portions of the pair of protrusion portions in the vehicle width direction.

According to the present invention, since the deck lid includes the protrusion portions extending in the vehicle longitudinal direction, the sporty appearance can be created, thereby providing a rear portion of the vehicle body with the superior (excellent) design. Further, since the respective upper portions of the pair of right-and-left protrusion portions are interconnected by the connecting portion, the rigidity, particularly the bending rigidity, in the vehicle width direction, of the deck lid is increased. Accordingly, the stability of moving of the deck lid can be ensured.

In an embodiment of the present invention, an area which is enclosed by the pair of protrusion portions, the connecting portion, and the base portion forms an opening portion where a back window is provided. According to this embodiment, since the opening portion where the back window is provided is formed, an appropriate backward view of a driver can be ensured.

In another embodiment of the present invention, the pair of protrusion portions extend from a front end portion to a rear end portion of the deck lid, and are configured such that an upper edge thereof slants rearward and downward. According to this embodiment, since the pair of protrusion portions extend from the front end portion to the rear end portion of the deck lid, the rigidity, particularly the bending rigidity, in the vehicle longitudinal direction, of the deck lid can be increased. Also, since the upper edge of the protrusion portion slants rearward and downward, an excellent flowing side-view can be provided with the vehicle.

In another embodiment of the present invention, a rear end portion of each of the pair of protrusion portions protrudes rearward beyond a rear end portion of the base portion. According to this embodiment, since the rear end portion of each of the pair of protrusion portions protrudes rearward beyond the rear end portion of the base portion, the rigidity of the deck lid can be further effectively increased by the pair of protrusion portions. Also, in a case in which a trunk room is provided in back of the base portion, the pair of protrusion portions can be prolonged, without shortening the length, in the vehicle longitudinal direction, of the trunk room. Accordingly, the excellent flowing side-view can be provided with the vehicle, ensuring a sufficiently large space of the trunk room.

In another embodiment of the present invention, each of the pair of protrusion portions is configured in a plan view to expand gradually inward in the vehicle width direction toward the opening portion from a rear end portion thereof. According to this embodiment, the rigidity of a periphery of the opening portion, particularly right-and-left both end portions of the opening portion can be effectively increased.

In another embodiment of the present invention, each of the pair of protrusion portions is configured in a back view to expand gradually inward in the vehicle width direction beside the opening portion toward a lower end portion thereof from an upper end portion thereof. According to this embodiment, the rigidity of a lower portion of the deck lid, particularly both-side lower corner portions of the opening portion can be effectively increased.

In another embodiment of the present invention, an inclination angle of an upper edge of the protrusion portion relative to a horizontal plane is smaller than an inclination angle of the back window relative to the horizontal plane in a side view. According to this embodiment, since the protrusion portion can be prolonged in the vehicle longitudinal direction without being influenced by an inclination of the back window, both the excellent flowing styling in a side view and the sufficient rigidity of the deck lid can be provided.

In another embodiment of the present invention, a lamp is provided at the base portion. According to this embodiment, even if the lamp is provided at the deck lid, the visibility of the lamp can be ensured stably during the moving of the deck lid.

In another embodiment of the present invention, the deck lid further comprises an opening portion for a window which is formed at the protrusion portions. According to this embodiment, the driver can directly view (see) obliquely backward outside through the opening portion for the window. Accordingly, a vehicle blind spot which may be generated obliquely backward by the protrusion portions of the deck lid can be reduced, thereby improving the visibility of an obliquely-backward area of the vehicle.

In another embodiment of the present invention, the rear vehicle-body structure of the vehicle further comprises a back window arranged in a use position thereof where the back window is located between the passenger cabin and the roof storage room in the roof closed state and arranged in a storage position thereof where the back window is stored in the roof storage room in the roof open state, wherein the opening portion for the window is configured to extend rearward beyond at least a portion of the back window, when viewed from a vehicle side, in the use position of the back window. According to this embodiment, since the opening portion for the window extends rearward beyond at least the portion of the back window, even if an obliquely-backward view through the back window is blocked by the protrusion portions, this problem can be effectively covered (compensated) by the opening portion for the window.

In another embodiment of the present invention, each of the pair of protrusion portions is configured in a plan view to expand gradually inward in the vehicle width direction toward the opening portion for the window from a rear end portion thereof. According to this embodiment, a rigidity decrease which may be caused by forming the opening portion for the window can be restrained.

In another embodiment of the present invention, a lamp is provided at the base portion of the deck lid, and an inside wall, in the vehicle width direction, of each of the protrusion portions is provided between the lamp and the opening portion for the window. According to this embodiment, it can be restrained by the inside wall of the protrusion portion that a light of the lamp reaches the opening portion for the window. Accordingly, it can be prevented that the light of the lamp is projected in the window provided at the opening portion for the window during the driver's obliquely-backward viewing, thereby further improving the visibility of the obliquely-backward area of the vehicle.

Other features, aspects, and advantages of the present invention will become apparent from the following description which refers to the accompanying drawings.

DETAILED DESCRIPTION OF THE INVENTION

Hereafter, a preferred embodiment of the present invention will be described specifically referring to the accompanying drawings.

A rear vehicle-body structure 1 of a vehicle according to the embodiment of the present invention will be described referring to FIGS. 1-12. In the following description, a "longitudinal direction" means a longitudinal direction of the vehicle.

The rear vehicle-body structure 1 is the one of an open car provided with an openable roof 2.

Figure 3:
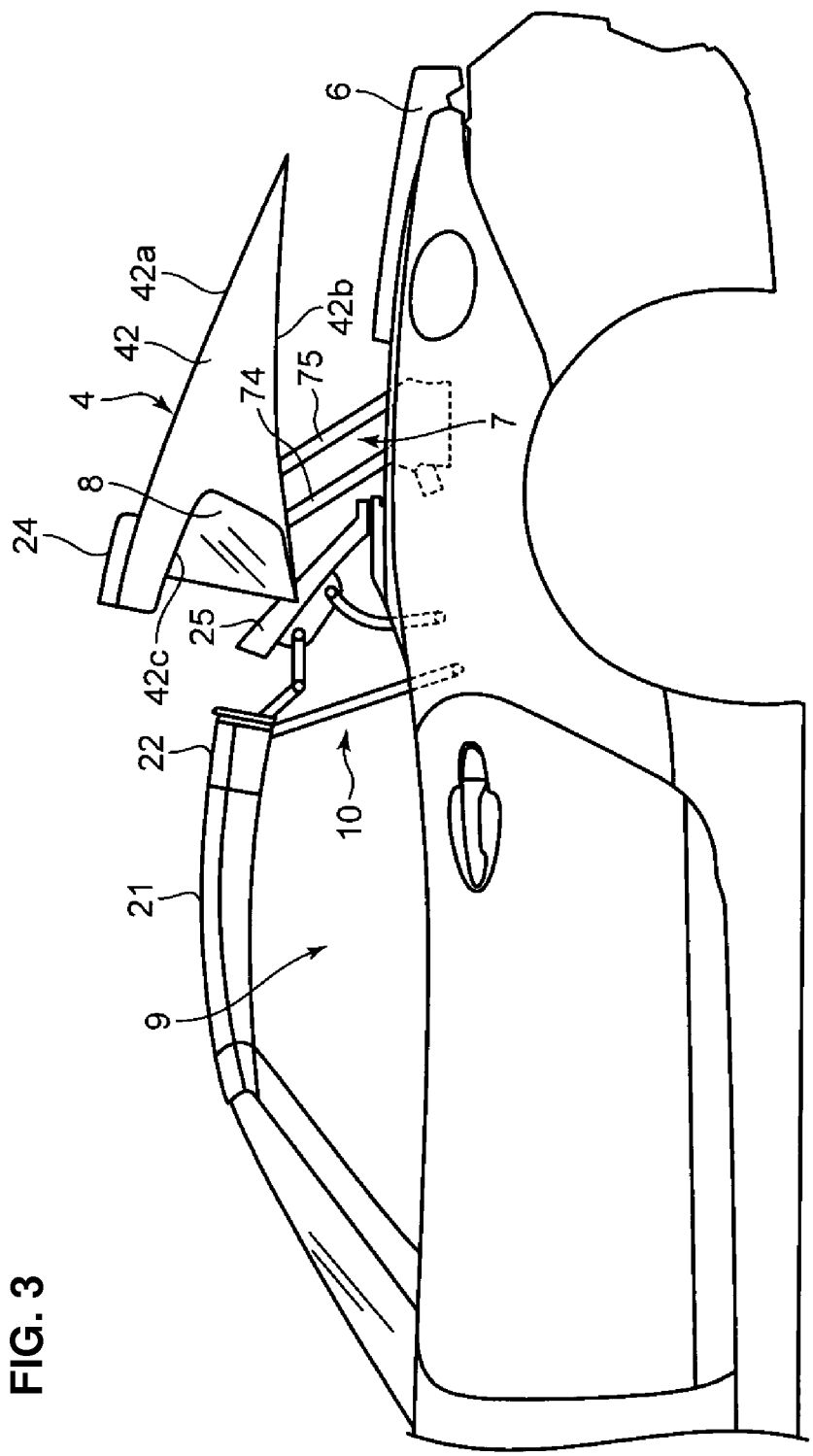
FIG. 3 is a side view showing the rear vehicle-body structure of the vehicle according to the embodiment of the present invention in a transitional state (before a roof is stored) from the state in which the openable roof is closed to a state in which the openable roof is open.
Figure 4:
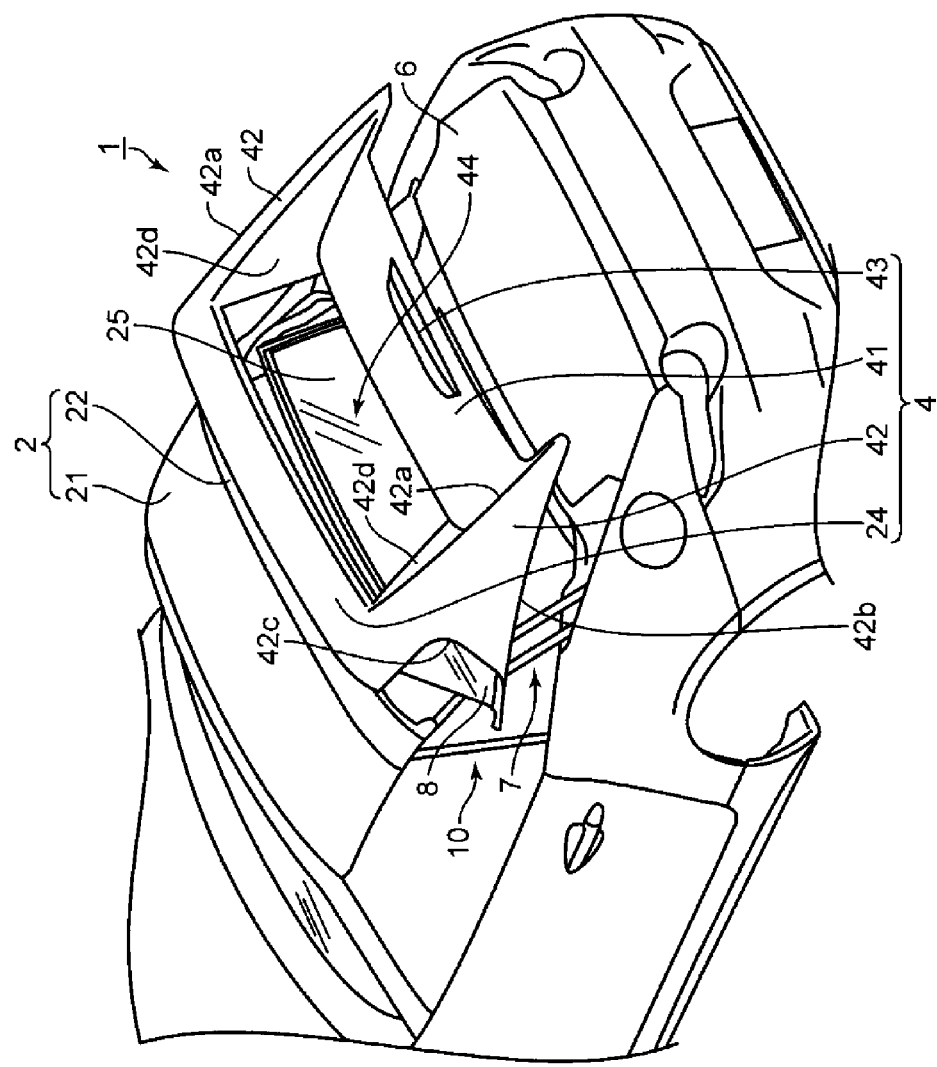
FIG. 4 is a perspective view of the rear vehicle-body structure shown in FIG. 3, when viewed from the oblique-rear side of the vehicle.

The rear vehicle-body structure 1 comprises the openable roof 2, a roof storage room 3 (see FIG. 8), a deck lid 4, a trunk room 5 (see FIG. 8), a trunk lid 6, a first link mechanism 7 (see FIGS. 3-5, 11 and 12), and a second link mechanism 10 (see FIGS. 3 and 4).

Figure 5:
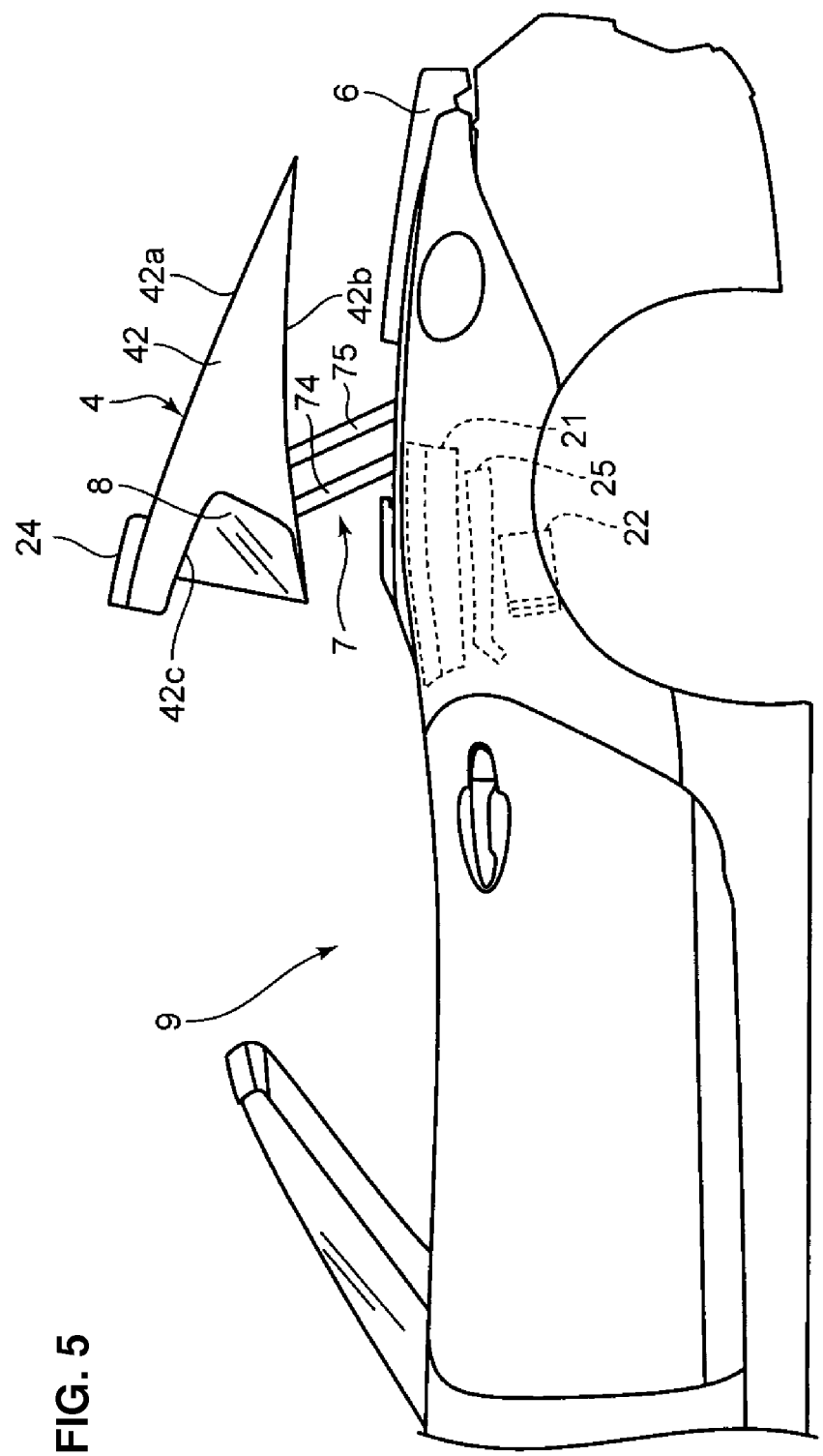
FIG. 5 is a side view showing the rear vehicle-body structure of the vehicle according to the embodiment of the present invention in a transitional state (after the roof is stored) from the state in which the openable roof is closed to the state in which the openable roof is open.
Figure 6:
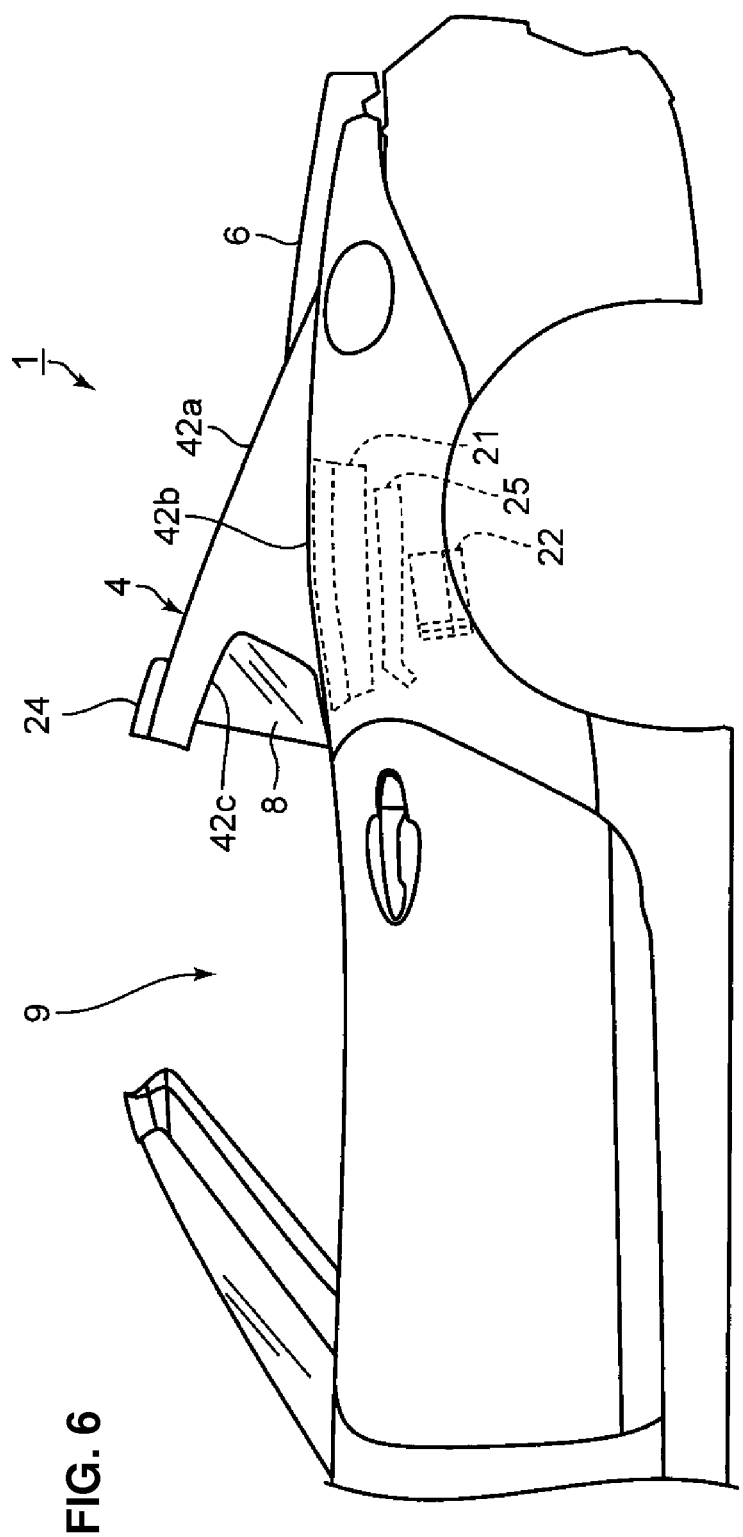
FIG. 6 is a side view showing the rear vehicle-body structure of the vehicle according to the embodiment of the present invention in the state in which the openable roof is open.
Figure 7:
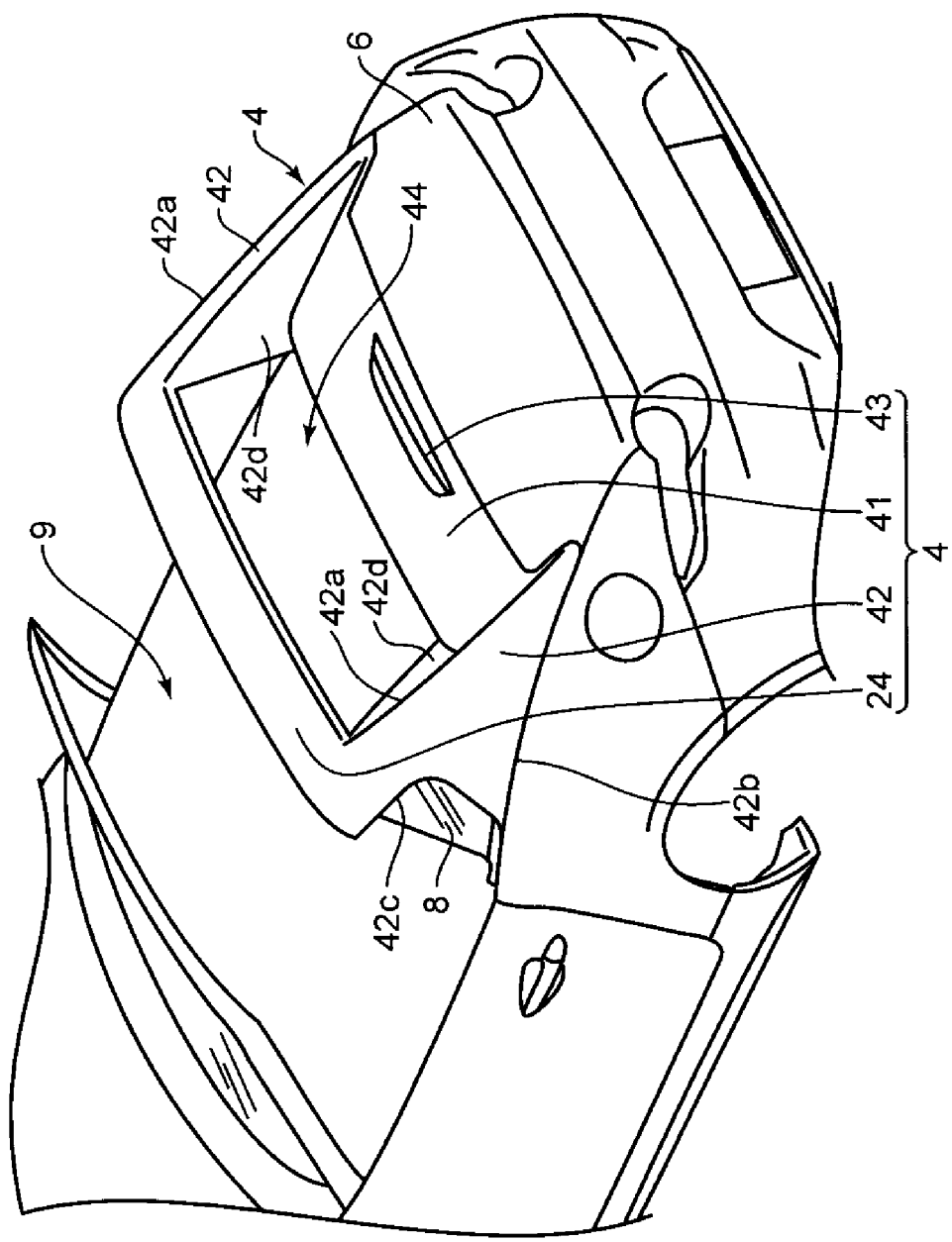
FIG. 7 is a perspective view of the rear vehicle-body structure shown in FIG. 6, when viewed from the oblique-rear side of the vehicle.

The openable roof 2 is supported at a vehicle body such that it is changeable between a roof closed state in which it covers over the passenger cabin 9 (see FIGS. 1 and 2) and a roof open state in which it is stored in the roof storage room 9 so as to open the passenger cabin 9 (see FIGS. 5-7).

The openable roof 2 is a hard-top type roof. The openable roof 2 comprises a front roof 21 and a middle roof 22.

The front roof 21 is a roof which covers over the passenger cabin 9. The middle roof 22 is a roof which is provided to be continuous rearward from the front roof 21 in the above-described roof closed state.

In the roof closed state, a plate-shaped rear header 24, which is a structural element of the deck lid 4, is provided to be continuous rearward from the middle roof 22, and a back window 25 (see FIG. 2) which is provided to be continuous below from the rear header 24.

Figure 1:
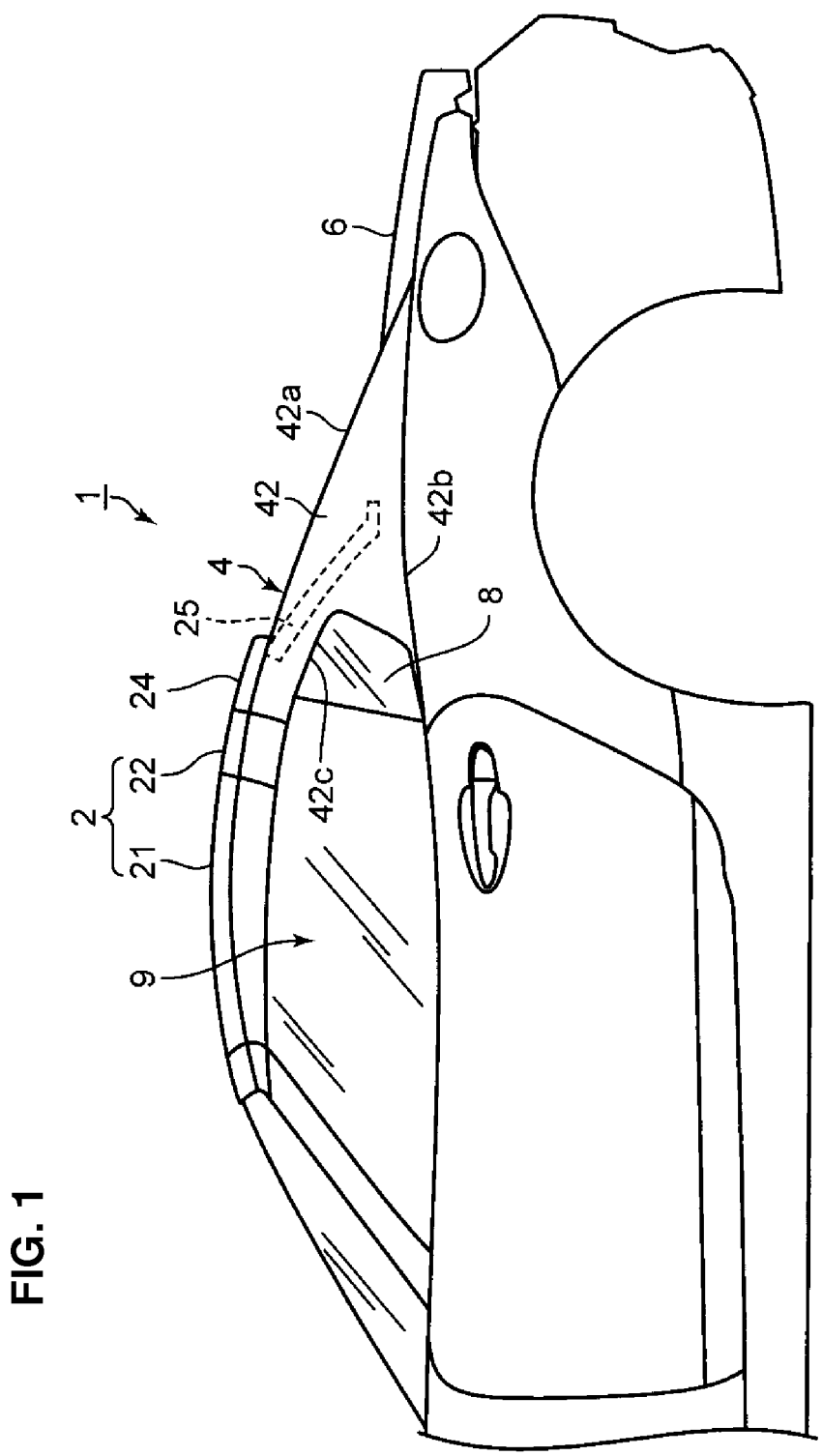
FIG. 1 is a side view showing a rear vehicle-body structure of a vehicle according to an embodiment of the present invention in a state in which an openable roof is closed.
Figure 2:
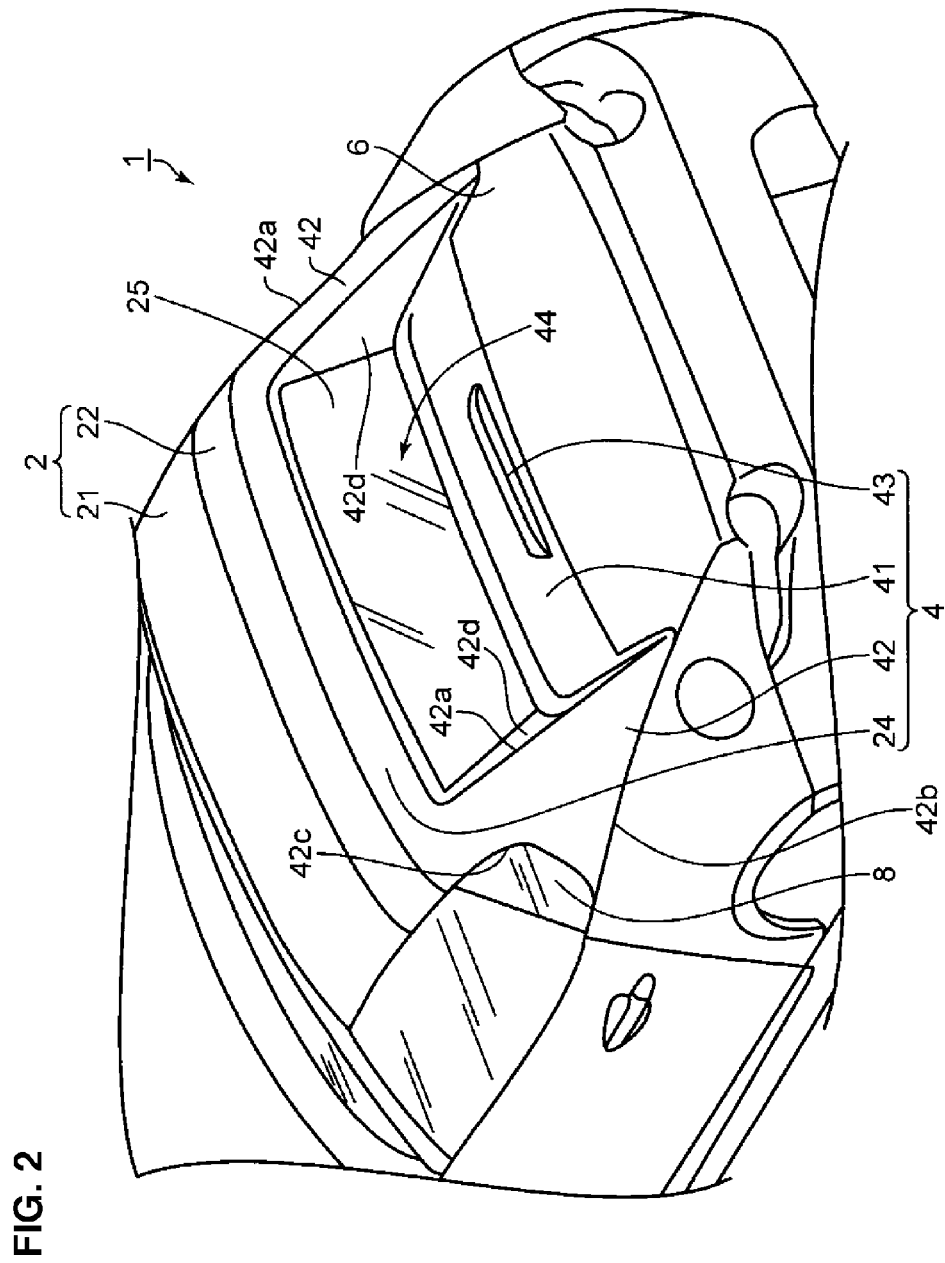
FIG. 2 is a perspective view of the rear vehicle-body structure shown in FIG. 1, when viewed from an oblique-rear side of the vehicle.

The front roof 21, the middle roof 22, the rear header 24, and the back window 25 tightly contact each other via seal members, not illustrated, in the roof closed state (see FIGS. 1 and 2). Meanwhile, the front roof 21, the middle roof 22, the rear header 24, and the back window 25 have a state of being separated from each other in the roof open state (see FIG. 6). The details will be described later.

The front roof 21, the middle roof 22, and the back window 25 are connected to each other by the second link mechanism 10 (FIGS. 3 and 4) and connected to the vehicle body by the second link mechanism 10. The rear header 24 is not coupled to the second link mechanism 10.

The roof storage room 3 (see FIG. 8) is provided between the passenger cabin 9 and the trunk room 5 which is provided behind the passenger cabin 9. The roof storage room 3 is a partition to store the front roof 21 and the middle roof 22 of the openable roof 2 and the back window 25. The front roof 21, the middle roof 22, and the back window 25 are stored in a state in which they are overlapped in a vertical direction as shown by broken lines in FIGS. 5 and 6.

Figure 8:
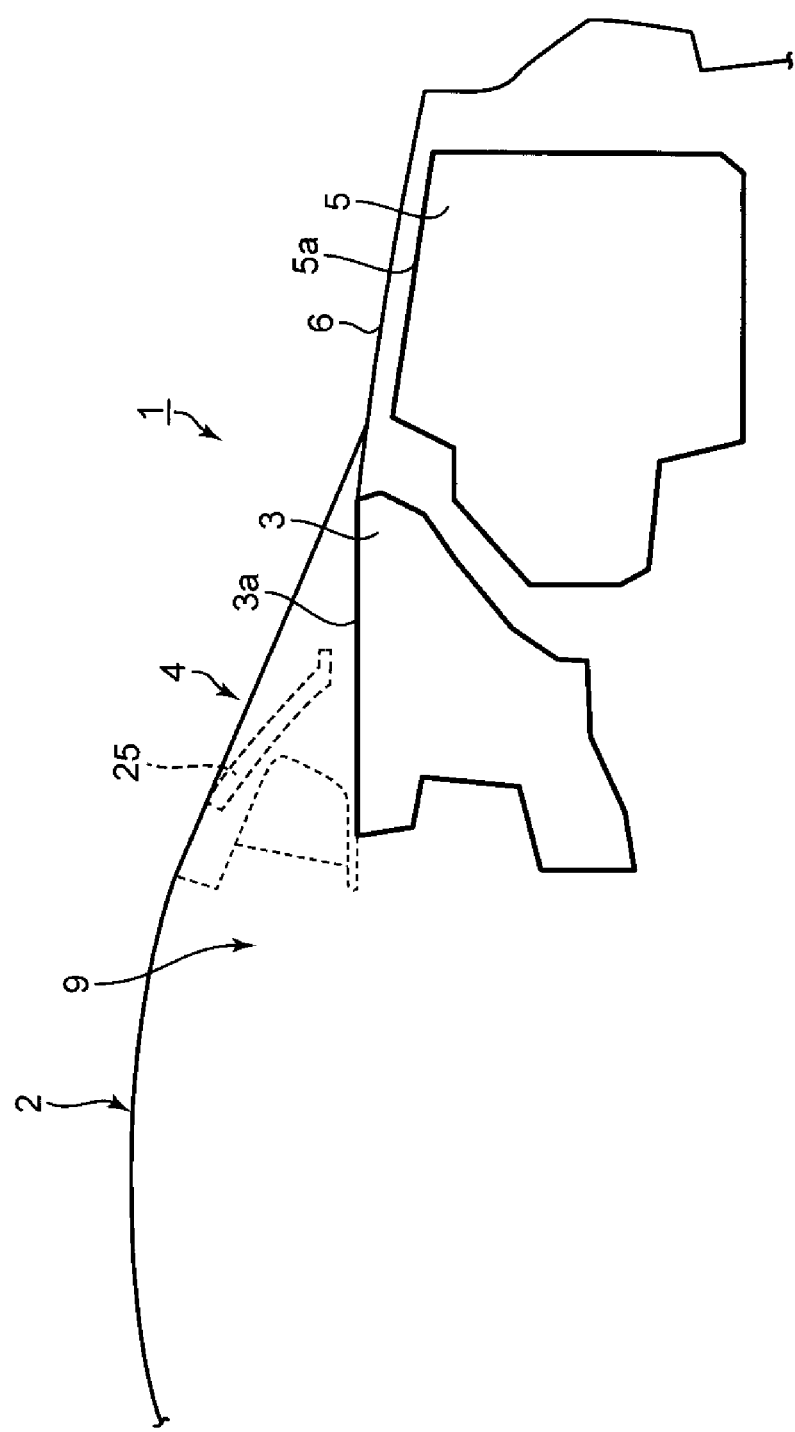
FIG. 8 is a diagram showing respective positions of storage room and a trunk room according to the embodiment of the present invention.

The deck lid 4 is openable and covers an opening portion 3a of the roof storage room 3 (see FIG. 8). The deck lid 4 comprises the base portion 41, a protrusion portion 42, the rear header 24, and a high-mount brake (stop) lamp 43 (see FIGS. 2 and 9).

Figure 9:
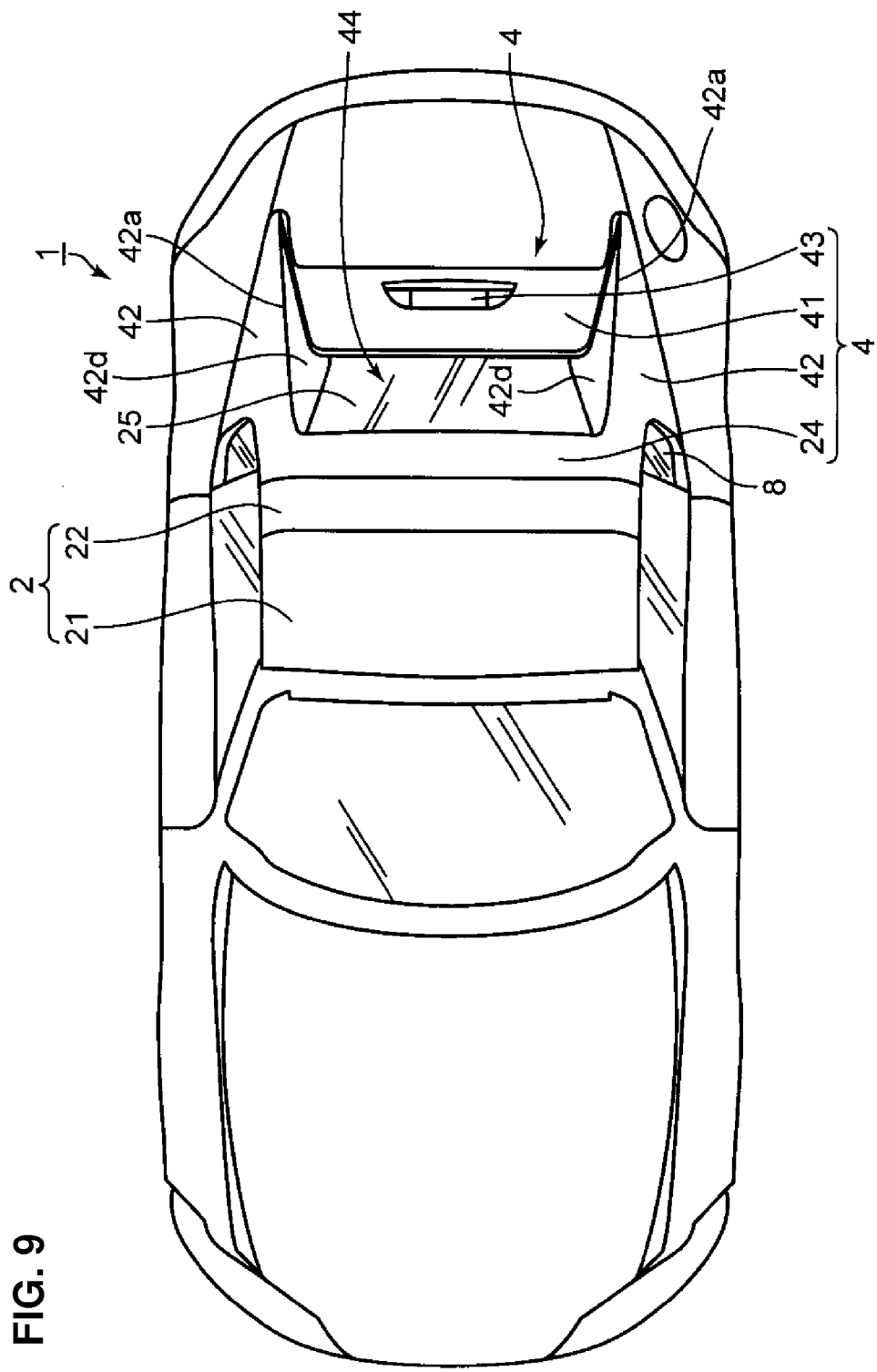
FIG. 9 is a plan view showing a whole part of the vehicle provided with the rear vehicle-body structure according to the embodiment of the present invention in the state in which the openable roof is closed.

The base portion 41 is a trapezoidal plate-shaped portion in the plan view, and its front portion is shorter than its rear portion in the vehicle width direction (see FIGS. 2 and 9). The high-mount brake lamp 43 is provided at an upper face of a central portion, in the vehicle width direction, of the base portion 41.

The protrusion portion 42 is formed integrally with a left end (one end in the vehicle width direction) and a right end (the other end in the vehicle width direction) of the base portion 41. The protrusion portion 42 protrudes upward relative to the base portion 41 and extends in the longitudinal direction.

The protrusion portion 42 is of a triangular shape when viewed from the vehicle side. That is, an upper edge 42a of the protrusion portion 42 slants rearward and downward and a lower end portion 42b of the protrusion portion 42 extends roughly horizontally, whereby the protrusion portion 42 is formed in a triangular shape in a side view. The upper edge 42a and the lower end portion 42b are respectively formed in a curve shape projecting upward. A cutout portion 42c is formed at a front-side portion of the above-described triangular portion (see FIG. 5), and a quarter window 8 is provided at the cutout portion 42c. This cutout portion 42c is included in an "opening portion for a window" in claims.

The cutout portion 42c is configured to extend to a position located rearward of an upper end portion of the back window 25 which slants rearward and downward in the roof closed state and the roof open state, when viewed from the vehicle side. An inclination of the upper edge portion 42a of the protrusion portion 42 is gentler than that of the back window 25 in the roof closed state. Thereby, a triangular wall portion which forms an inside side face, in the vehicle width direction, of the protrusion portion 42 (hereafter, referred to as a "vehicle-width-direction inside wall 42d") is formed in back of a side portion of the back window 25 (see FIGS. 2, 4, 7, 9 and 10). This vehicle-width-direction inside wall 42d is positioned between the high-mount brake lamp 43 and the cutout portion 42c.

Herein, there may be provided a penetrating hole (not illustrated) which is formed by cutting a closed area may be provided, in place of the open-shaped cutout portion 42c, where the quarter window is provided. This penetrating home is included in the "opening portion for a window" as well.

A rear end portion of the protrusion portion 42 protrudes rearward from a rear end portion of the base portion 41 (see FIGS. 2 and 9). This rearward-protrusion portion is configured in a shape narrowing rearward such that its size in the vehicle width direction and its size in the vertical direction (i.e., its width and its height) thereof become smaller toward the vehicle rear side.

An upper end portion (an upper end portion of the upper edge 42a) of the protrusion portion 42 positioned at one end in the vehicle with direction (hereafter, referred to as "the left-side protrusion portion 42") and an upper end portion (an upper end portion of the upper edge 42a) of the protrusion portion 42 positioned at the other end (hereafter, referred to as "the right-side protrusion portion 42") are interconnected by the rear header 24. The left-side protrusion portion 42, the rear header 24, and the right-side protrusion portion 42 are formed integrally.

The left-side protrusion portion 42 serves as a left-side rear pillar, and the right-side protrusion portion 42 serves as a right-side rear pillar.

Herein, the rear header 24 may not be necessarily connected to the upper end portion as long as it is connected to a position of the protrusion portion 42 which is located above the lower end portion of the protrusion portion 42.

A rectangular-shaped area which is enclosed by the left-side protrusion portion 42, the right-side protrusion portion 42, the rear header 24, and the base portion 41 forms an opening portion 44 where the back window 25 is provided (see FIGS. 2 and 4).

Each of the left-side protrusion portion 42 and the right-side protrusion portion 42 is configured in the plan view such that it expands gradually inward in the vehicle width direction toward the opening portion 44 and the cutout portion 42c (see FIG. 9).

Figure 10:
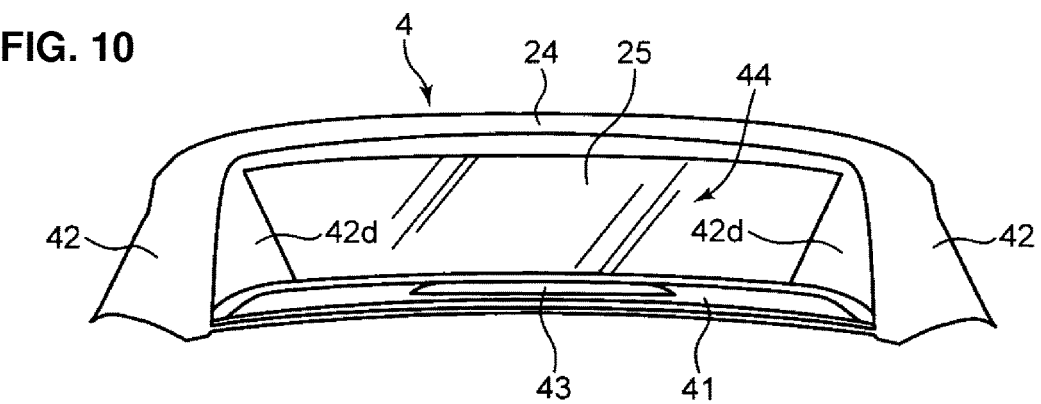
FIG. 10 is a back view of a deck lid and a back window.

Further, each of the left-side protrusion portion 42 and the right-side protrusion portion 42 is configured in the back view such that it expands gradually inward in the vehicle width direction beside the opening portion toward its lower end portion from its upper end portion (see FIG. 10).

An inclination angle of an upper edge of the protrusion portion 42 relative to a horizontal plane is smaller than an inclination angle of the back window 25 relative to the horizontal plane, when viewed from the vehicle side (see FIG. 2).

The first link mechanism 7 (see FIGS. 11 and 12) is provided inside the roof storage room 3 at each of the both end portions in the vehicle with direction (the left end portion and the right end portion). The first link mechanism 7 connects a bottom portion of the deck lid 4 and a side portion (a side wall, for example) of the roof storage room 3. The first link mechanism 7 supports a position near a front portion of the protrusion portion 42.

The first link mechanism 7 is a mechanism to make the deck lid 4 swing by using a motor 71 as a driving source. The first link mechanism 7 is a quadric link mechanism. The first link mechanism 7 comprises a main bracket 72 which is a base member, a lid bracket 73 which is fixed to the deck lid 4, a drive lever 74 which has both ends thereof which are respectively pivotally coupled to the main bracket 72 and the lid bracket 73 and drives the first link mechanism 7, and a driven lever 75 which has both ends thereof which are respectively pivotally coupled to the main bracket 72 and the lid bracket 73 and restricts a swinging range and a swinging move of the deck lid 4. The drive lever 74 and the driven lever 75 are arranged roughly in parallel to each other. The main bracket 72 is fixed to the side wall of the roof storage room 3, thereby fixed to the vehicle body.

A driving force of the motor 71 is transmitted to the drive lever 74 via a pinion 77 and a sector gear 76. When the motor 71 rotates in a forward direction from a state shown in FIG. 11, the drive lever 74 receives the driving force and rotate the drive lever 74 and the driven lever 75 so that these levers 74, 75 rise up, and the lid bracket 73 moves in an arrow A direction according to this rising move (see FIGS. 11 and 12). According to this move, the deck lid 4 which is fixed to the lid bracket 73 goes up, moving rearward, to a position where the deck lid 4 is located at an obliquely rearward-and-upward position relative to the opening portion 3a of the roof storage room 3. This move prevents the openable roof 2 and the back window 25 from interfering with the deck lid 4.

After the deck lid 4 is located at the obliquely rearward-and-upward position relative to the opening portion 3a, when the motor 71 rotates in a backward (reverse) direction, the drive lever 74 receives this rotational driving force and the drive and driven levers 74, 75 rotate so that these levers 74, 75 fall down. The lid bracket 73 moves in an arrow B direction according to this falling-down move (see FIG. 12). According to this move, the deck lid 4 which is fixed to the lid bracket 73 covers and close the opening portion 3a of the roof storage room 3.

The second link mechanism 10 (see FIGS. 3 and 4) is provided inside the roof storage room 3 at each of the both end portions (the left end portion and the right end portion) in the vehicle width direction. The left-side second link mechanism 10 connects respective left end portions of the front roof 21, the middle roof 22, and the back window 25 and a left-side side portion (a side wall, for example) of the roof storage room 3. Further, the right-side second link mechanism 10 connects respective right end portions of the front roof 21, the middle roof 22, and the back window 25 and a right-side side portion (a side wall, for example) of the roof storage room 3.

The second link mechanism 10 is driven by a motor, not illustrated. In a case in which the roof is changed to the roof open state from the roof closed state, the second link mechanism 10 operates to open the middle roof 22, the back window 25, and the front roof 21 by the motor's rotation in the forward direction after the deck lid 4 starts retreating to the position where the deck lid 4 does not interfere with the openable roof 2 and the back window 25 (see FIG. 3). Specifically, according to the operation of the second link mechanism 10 which is caused by the motor's rotation in the forward direction, the front roof 21 and the middle roof 22 of the openable roof 2 and the back window 25 are moved rearward rotationally and finally stored in the roof storage room 3 such that these members 21, 22, 25 are overlapped in order from below (see FIG. 5).

Meanwhile, in a case in which the roof is changed to the roof closed state from the roof open state, the second link mechanism 10 operates to close the middle roof 22, the back window 25, and the front roof 21 by the motor's rotation in the backward (reverse) direction after the deck lid 4 starts retreating to the position where the deck lid 4 does not interfere with the openable roof 2 and the back window 25 (see FIG. 5). Specifically, according to the operation of the second link mechanism 10 which is caused by the motor's rotation in the backward (reverse) direction, the front roof 21 and the middle roof 22 of the openable roof 2 and the back window 25 are moved forward rotationally and finally positioned in a state in which the front roof 21 and the middle roof 22 are continuous to each other and the back window 25 is spaced rearward apart from the rear end of the middle roof 22 (see FIG. 3). Herein, a separation distance of the back window 25 and the rear end of the middle roof 22 matches a length, in the vehicle longitudinal direction, of the rear header 24.

The trunk room 5 is provided behind the roof storage room 3 and below the trunk lid 6. The trunk room 5 is a partition to store baggage of the vehicle.

The trunk lid 6 covers an opening portion 5a (see FIG. 8) of the trunk room 5 so as to open or close the opening portion 5a. The trunk lid 6 is rotatably attached to the vehicle body via a hinge, not illustrated, at its front end portion.

Hereafter, operations of the openable roof 2 and the deck lid 4 will be described.

A changing operation of the openable roof 2 from the state (the roof closed state) in which the roof 2 covers over the passenger cabin 8 to the state (the roof open state) in which the roof 2 opens the passenger cabin 9 will be described.

The deck lid 4 covers the opening portion 3a in the state in which the openable roof 2 covers over the passenger cabin 9 as shown in FIGS. 1 and 2. In this state, the rear header 24 is provided to be continuous rearward from the middle roof 22, and the back window 25 is arranged at the opening portion 44 of the deck lid 4. A gap between a periphery of the opening portion 44 of the deck lid 4 and the peripheral portion of the back window 25 is sealed by a seal member, not illustrated. Further, the drive lever 74 and the driven lever 75 are in a state in which these are fallen down in parallel to each other, and the first link mechanism 7 is folded (see FIG. 11).

Figure 12:
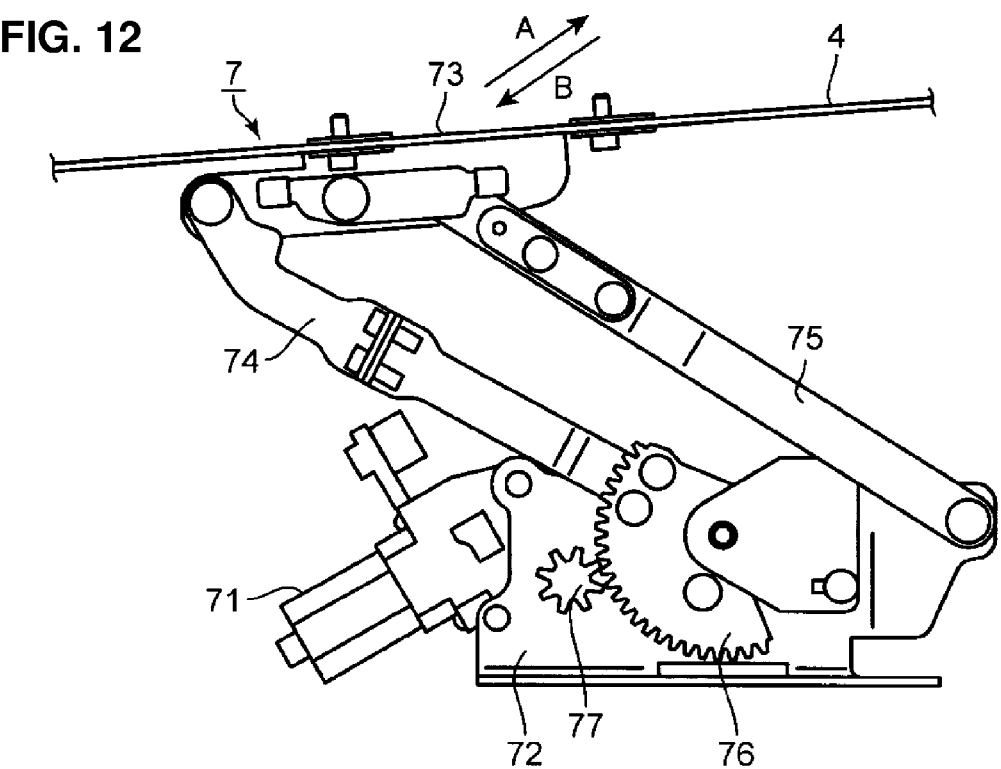
FIG. 12 is a diagram showing an example of the first link mechanism according to the embodiment of the present invention in the transitional state between the closed state and the open state of the openable roof.
Figure 13:
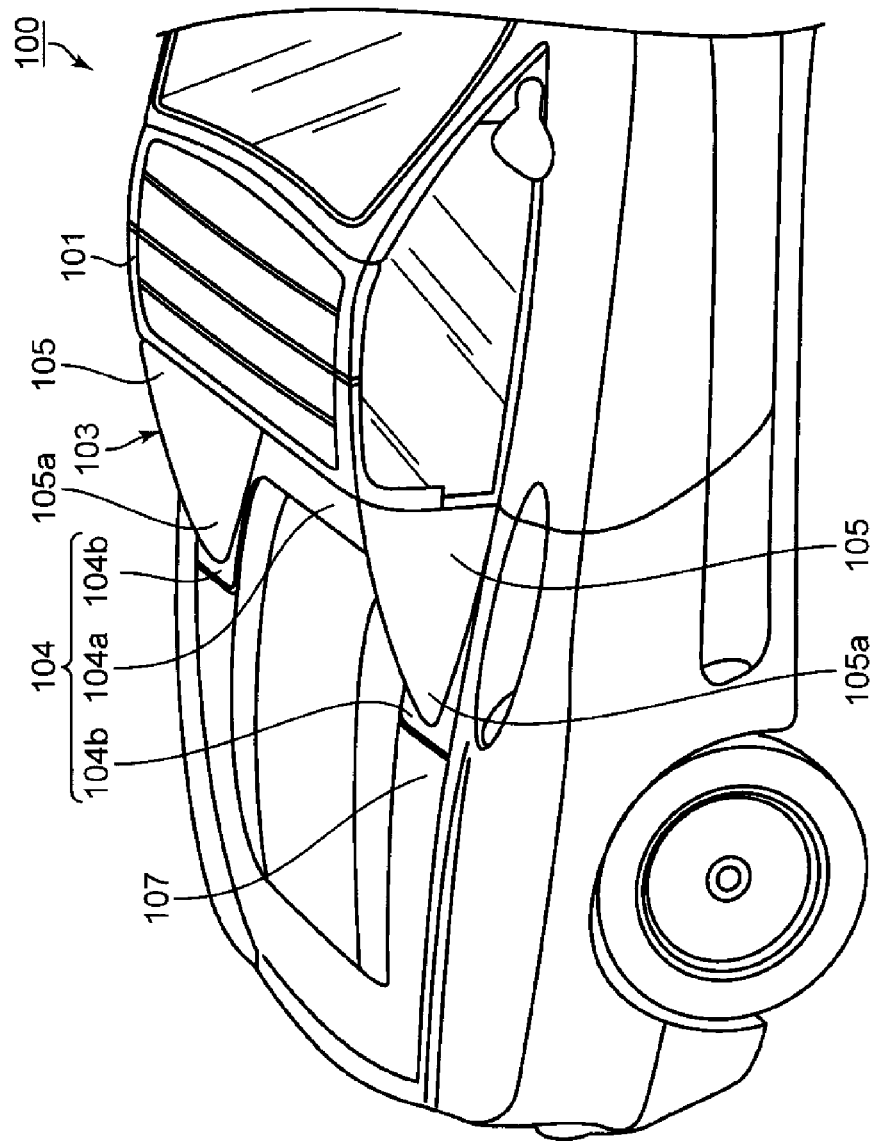
FIG. 13 is a perspective view showing a conventional rear vehicle-body structure of a vehicle (the above-described patent document of International Publication No. WO 2005/061253) in a closed state of a foldable roof.
Figure 14:
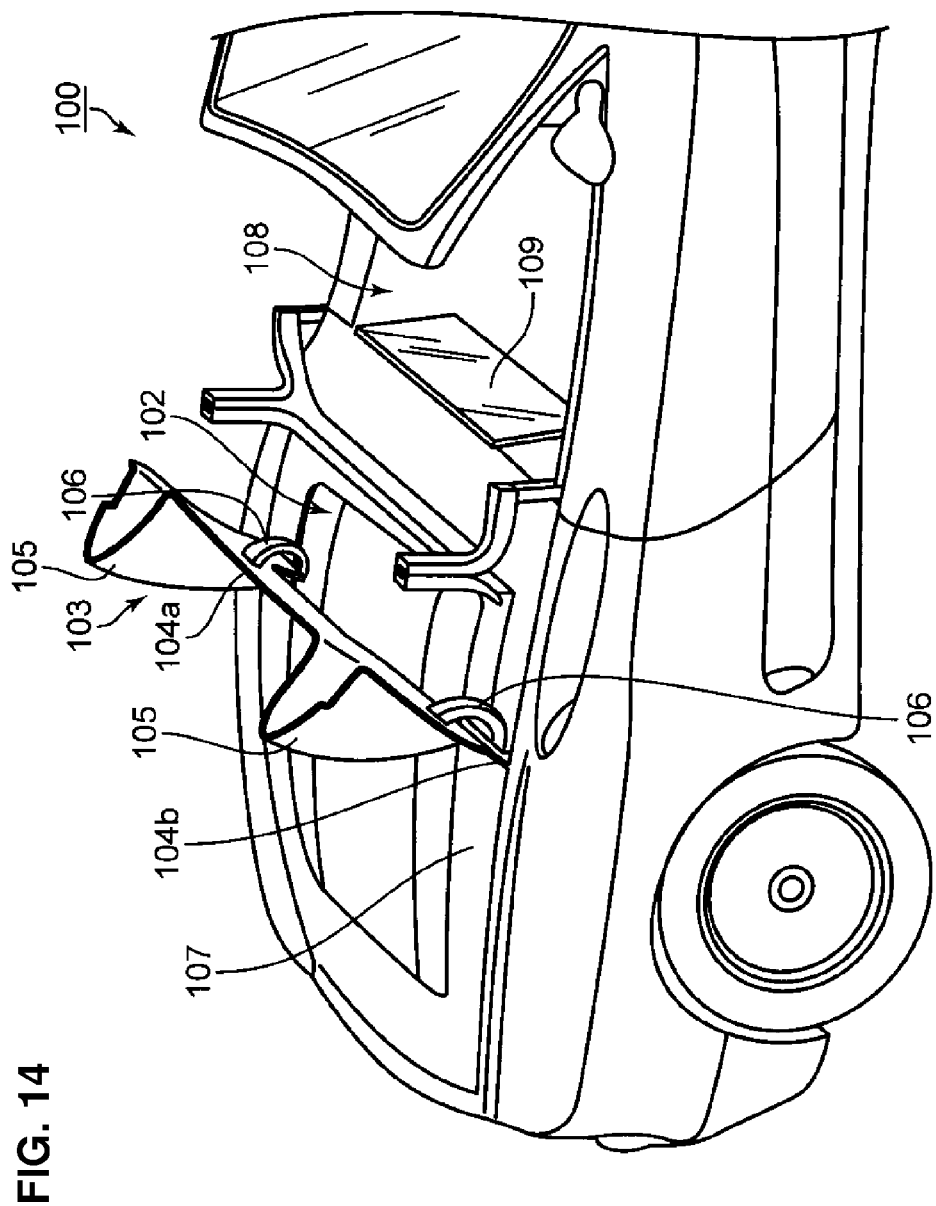
FIG. 14 is a perspective view showing the above-described conventional rear vehicle-body structure of the vehicle in a transitional state from the closed state to an open state of the foldable roof.
Figure 15:
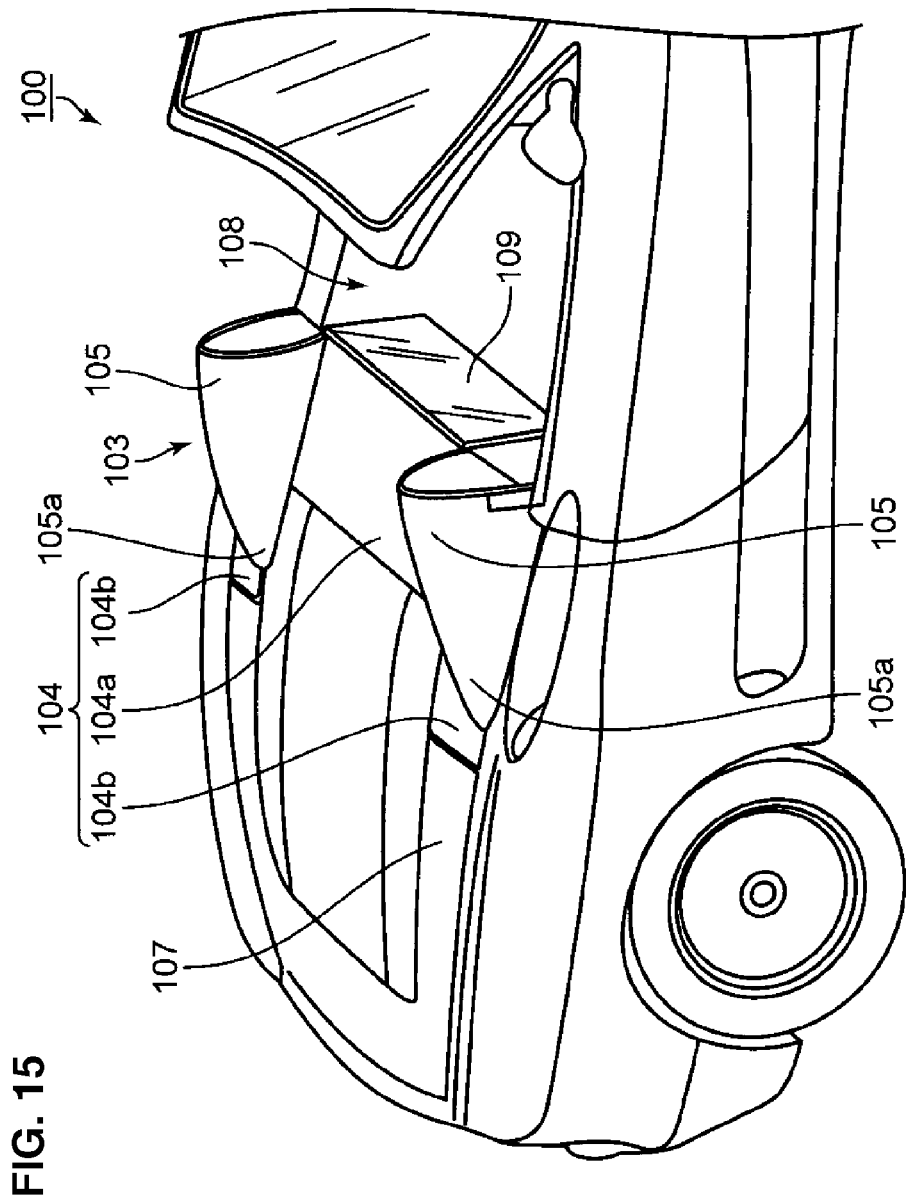
FIG. 15 is a perspective view showing the above-described conventional rear vehicle-body structure of the vehicle in the open state of the foldable roof.

When a user presses a roof-open button, not illustrated, which is provided near a driver's seat in the roof closed state, the motor 71 rotates in the forward direction, so that the drive lever 74 and the driven lever 75 of the first link mechanism 7 rise up (see FIG. 12). According to this rising move of the first link mechanism 7, the deck lid 4 is moved obliquely rearward and upward relative to the opening portion 3a (see FIGS. 3 and 4).

When the deck lid 4 is moved obliquely rearward and upward relative to the opening portion 3a, the rear header 24 gets separated from the middle roof 22, the back window 25 gets separated from the opening portion 44, and the deck lid 4 gets separated from the front roof 21, the middle roof 22, and the back window 25 (see FIGS. 3 and 4).

Next, the second link mechanism 10 which is coupled to the openable roof 2 is driven by the motor. According to the operation of the second link mechanism 10, the front roof 21 and the middle roof 22 of the openable roof 2 and the back window 25 rotate rearward such that the middle roof 22, the back window 25, and the front roof 21 are overlapped in order from below. These members 22, 25, 21 are stored in the roof storage room 3 in the overlapping state (see FIG. 5).

Figure 11:
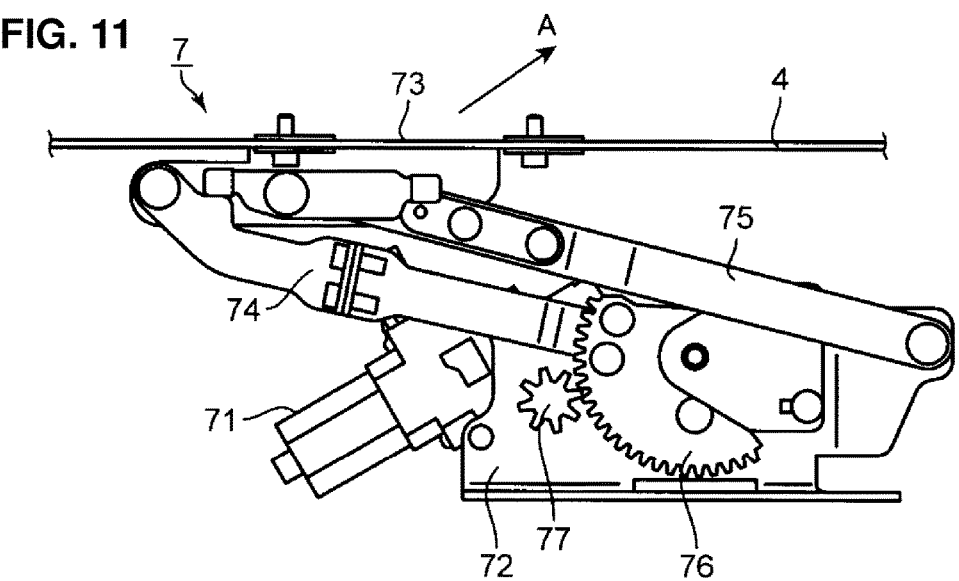
FIG. 11 is a diagram showing an example of a first link mechanism according to the embodiment of the present invention in the closed state and the open state of the openable roof.

Next, the motor 71 rotates in the backward (reverse) direction, and the drive lever 74 and the driven lever 75 of first link mechanism 7 fall down (see FIG. 11). According to this falling-down move of the levers 74, 75, the deck lid 4 covers the opening portion 3a (closes the opening portion 3a) (see FIGS. 6 and 7). The drive lever 74 and the driven lever 75 are in the falling-down state in which these levers 74, 75 are arranged roughly in parallel to each other. Thus, the first link mechanism 7 returns to a folded state (see FIG. 11).

Herein, a changing operation of the roof from the roof open state to the roof closed state is done in an inverse order of the above-described changing operation (from the roof closed state to the roof open state). That is, the operation changes from the roof open state shown in FIGS. 6 and 7 to the state shown in FIG. 5, then to the state shown in FIGS. 3 and 4, and finally to the roof closed state shown in FIGS. 1 and 2.

As described above, according to the present embodiment, since the deck lid 4 includes the protrusion portions 42 extending in the vehicle longitudinal direction, the sporty appearance can be created, thereby providing the rear portion of the vehicle body with the superior (excellent) design. Further, since the respective upper portions of the pair of right-and-left protrusion portions 42 are interconnected by the rear header 24, the rigidity, particularly the bending rigidity, in the vehicle width direction, of the deck lid 4 is increased. Accordingly, the stability of moving of the deck lid 4 between the position of covering the opening portion 3a of the roof storable room 3 (see FIGS. 1, 2, 6-9) and the position of retreating from the opening portion 3a (see FIGS. 3-5) can be ensured. Further, since the deck lid 4 is movable not only upward but rearward, the openable roof 2 can be stored without any interference of the openable roof 2 with the deck lid 4 when the openable roof 2 is moved from the closed state to the open state, even if the upward-move amount of the deck lid 4 is relatively small.

Further, since an area enclosed by the right-and-left protrusion portions 42, the rear header 24, and the base portion 41 forms the opening portion 44 where the back window 25 is provided, the backward view of the driver can be ensured.

Moreover, since the right-and-left protrusion portions 42 extend from the front end portion to the rear end portion of the deck lid 4, the rigidity, particularly the bending rigidity, in the vehicle longitudinal direction, of the deck lid 4 can be increased. Also, since the upper edge of the right-and-left protrusion portions 42 slants rearward and downward, an excellent flowing side-view can be provided with the vehicle.

Also, since the rear end portion of each of the right-and-left protrusion portions 42 protrudes rearward beyond the rear end portion of the base portion 41, the protrusion portions 42 can be prolonged, without shortening the length, in the vehicle longitudinal direction, of the trunk room. Accordingly, the rigidity of the deck lid 4 can be further effectively increased, and the excellent flowing side-view can be provided with the vehicle, ensuring a sufficiently large space of the trunk room.

Further, since each of the right-and-left protrusion portions 42 is configured in the plan view to expand gradually inward in the vehicle width direction toward the opening portion 44 from its rear end portion, the rigidity of a periphery of the opening portion 44, particularly right-and-left both end portions of the opening portion 44 can be effectively increased.

Moreover, since each of the right-and-left protrusion portions 42 is configured in the back view to expand gradually inward in the vehicle width direction beside the opening portion 44 toward its lower end portion from its upper end portion, the rigidity of the lower portion of the deck lid 4, particularly both-side lower corner portions of the opening portion 44 can be effectively increased.

Also, since the inclination angle of the upper edge of the protrusion portion 42 relative to the horizontal plane is smaller than the inclination angle of the back window 25 relative to the horizontal plane in a side view, the protrusion portion 42 can be prolonged in the vehicle longitudinal direction without being influenced by the inclination of the back window 25. Accordingly, both the excellent flowing styling in the side view and the sufficient rigidity of the deck lid 4 can be provided.

Further, since the high-mount brake lamp 43 is provided at the base portion 41 of the deck lid 4 stably moving, even if this lamp 43 is provided at the deck lid 4, the visibility of the lamp 43 can be ensured stably during the moving of the deck lid 4.

Moreover, since the cutout portion 42c is formed at the protrusion portion 42 of the deck lid 4, and the quarter window 8 is provided at the cutout portion 42c, the driver can directly view (see) obliquely backward outside through the quarter window 8. Accordingly, the vehicle blind spot which may be generated obliquely backward by the protrusion portions 42 can be reduced, thereby improving the visibility of an obliquely-backward area of the vehicle.

Also, since the cutout portion 42c extends rearward beyond the upper end portion of the back window 25 which slants rearward and downward in the roof closed state and the roof open state, when viewed from the vehicle side, even if an obliquely-backward view through the back window 25 is blocked by the protrusion portions, this problem can be effectively covered (compensated) by the cutout portion 42c.

Further, since the protrusion portion 42 is configured in the plan view to expand gradually inward in the vehicle width direction toward the cutout portion 42c from its rear end portion, a rigidity decrease which may be caused by forming the cutout portion 42c can be restrained.

Also, since the inside wall 42d, in the vehicle width direction, of the protrusion portion 42 is provided between the high-mount brake lamp 43 and the cutout portion 42c, it can be restrained by the inside wall 42d that a light of the lamp 43 reaches the cutout portion 42c. Accordingly, it can be prevented that the light of the lamp 43 is projected in the quarter window 8 during the driver's obliquely-backward viewing, thereby further improving the visibility of the obliquely-backward area of the vehicle.

The present invention should not be limited to the above-described embodiment, and any other modifications or improvements may be applied within the scope of a spirit of the present invention.

For example, the first link mechanism 7 may be configured such that a portion of the link bracket 23 which is positioned on the side of the drive lever 74 is located at a higher level than a portion of the link bracket 23 which is positioned on the side of the driven lever 75 (the lid bracket 73 slants such its front portion is higher than its rear portion) when the both levers 74, 75 rise up. In this case, when the deck lid 4 goes up to the position located obliquely rearward and upward of the opening portion 3a, a distance between the portion of the deck lid 4 which is positioned on the side of the drive lever 74 is larger than that between the portion of the deck lid 4 which is positioned on the side of the drive lever 75, so that the openable roof 2 can be allowed to easily come in the opening portion 3a.

What is claimed is:

1. A rear vehicle-body structure of a vehicle, comprising:
an openable roof capable of covering over a passenger cabin;
a roof storage room provided in back of the passenger cabin to store at least a portion of the openable roof;
a deck lid provided to move so as to cover an opening portion of the roof storage room in a roof closed state in which the openable roof covers over the passenger cabin and in a roof open state in which the portion of the openable roof is stored in the roof storage room and to open the opening portion of the roof storage room in a transitional state between the roof closed state and the roof open state; and
a link mechanism connecting the deck lid to a vehicle body such that the deck lid is moved, as a whole, in a vehicle longitudinal direction relative to the vehicle body,
wherein said deck lid comprises a base portion, a pair of right-and-left protrusion portions which are integrally formed at both end portions, in a vehicle width direction, of said base portion, protrude upward relative to the base portion, and extend in the vehicle longitudinal direction, and a connecting portion which interconnects respective upper portions of said pair of protrusion portions in the vehicle width direction, and
said link mechanism is a quadric link mechanism which supports a front portion of said deck lid at one end thereof and connects to a side portion of said roof storage room at the other end thereof, the quadric link mechanism being configured to move the deck lid, as a whole, upward and rearward relative to the vehicle body when being rotated rearward.

2. The rear vehicle-body structure of the vehicle of claim 1, wherein an area which is enclosed by said pair of protrusion portions, said connecting portion, and said base portion forms an opening portion where a back window is provided.

3. The rear vehicle-body structure of the vehicle of claim 1, wherein said pair of protrusion portions extend from a front end portion to a rear end portion of said deck lid, and are configured such that an upper edge thereof slants rearward and downward.

4. The rear vehicle-body structure of the vehicle of claim 1, wherein a rear end portion of each of said pair of protrusion portions protrudes rearward beyond a rear end portion of said base portion.

5. The rear vehicle-body structure of the vehicle of claim 2, wherein each of said pair of protrusion portions is configured in a plan view to expand gradually inward in the vehicle width direction toward said opening portion from a rear end portion thereof.

6. The rear vehicle-body structure of the vehicle of claim 2, wherein each of said pair of protrusion portions is configured in a back view to expand gradually inward in the vehicle width direction beside said opening portion toward a lower end portion thereof from an upper end portion thereof.

7. The rear vehicle-body structure of the vehicle of claim 2, wherein an inclination angle of an upper edge of said protrusion portion relative to a horizontal plane is smaller than an inclination angle of said back window relative to the horizontal plane in a side view.

8. The rear vehicle-body structure of the vehicle of claim 1, wherein a lamp is provided at said base portion.

9. The rear vehicle-body structure of the vehicle of claim 1, wherein said deck lid further comprising an opening portion for a window which is formed at said protrusion portions.

10. The rear vehicle-body structure of the vehicle of claim 9, further comprising a back window arranged in a use position thereof where the back window is located between said passenger cabin and said roof storage room in said roof closed state and arranged in a storage position thereof where the back window is stored in the roof storage room in said roof open state, wherein said opening portion for the window is configured to extend rearward beyond at least a portion of said back window, when viewed from a vehicle side, in said use position of the back window.

11. The rear vehicle-body structure of the vehicle of claim 9, wherein each of said pair of protrusion portions is configured in a plan view to expand gradually inward in the vehicle width direction toward said opening portion for the window from a rear end portion thereof.

12. The rear vehicle-body structure of the vehicle of claim 9, wherein a lamp is provided at the base portion of said deck lid, and an inside wall, in the vehicle width direction, of each of said protrusion portions is provided between said lamp and said opening portion for the window.

\* \* \* \* \*